US000001314H

United States Statutory Invention Registration [19]

[11] Reg. Number: H1314

Shipes

[43] Published: Jun. 7, 1994

[54] CATHODE MANUFACTURING PROCESS

[75] Inventor: M. Henry Shipes, Yerington, Nev.

[73] Assignee: Arimetco, Inc., Tucson, Ariz.

[21] Appl. No.: 917,949

[22] Filed: Jul. 24, 1992

[51] Int. Cl.[5] ..... H01R 43/00

[52] U.S. Cl. ..... 29/825; 29/521; 29/523; 29/525; 29/861; 29/854; 29/505; 29/865; 29/882; 29/747; 72/479

[58] Field of Search ..... 204/286, 288, 297 R, 204/279, 280; 72/479; 29/521, 523, 525, 861, 825, 854, 505, 745, 747, 882, 861, 865

[56] References Cited

U.S. PATENT DOCUMENTS

| | | | |
|---|---|---|---|
| 2,434,731 | 1/1948 | zu Eltz | 204/286 |
| 3,260,662 | 7/1966 | Henegar | 204/279 |
| 3,515,661 | 6/1970 | Coulter et al. | 204/263 |
| 3,680,897 | 8/1972 | Linthout | 29/525 |
| 4,606,804 | 8/1986 | Schulke et al. | 204/286 |
| 4,647,358 | 3/1987 | Bartsch et al. | 204/286 |
| 4,871,436 | 10/1989 | den Hartog | 204/286 |
| 4,882,027 | 11/1989 | Borst et al. | 204/286 |

*Primary Examiner*—Donald P. Walsh
*Assistant Examiner*—Ngoclan T. Mai

[57] ABSTRACT

A process for preparing a cathode assembly comprising forming a hanger assembly by inserting an electrically conductive metal hanger core having a curved cross section into a metal tube jacket having a rectangular cross section such that the sides of the metal tube are displaced outward by the outer surface of the hanger core, effecting good electrical contact between the hanger core and the metal tube jacket. One edge of a metal sheet is rigidly attached to the metal tube jacket along its length, perpendicular to the tangent of the outer surface of the metal tube jacket. The cathode assembly produced according to this process has utility in a wide variety of electrolytic manufacturing processes, especially in the electrolytic refining of copper.

1 Claim, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

CATHODE MANUFACTURING PROCESS

BACKGROUND OF THE INVENTION

The present invention relates to electrode assemblies for use in electrolytic cells. More particularly, the invention relates to electrode assemblies for use as cathodes in the electrolytic refining or electrowinning of metals, such as copper, or in the manufacture of chlorates, perchlorates, manganese dioxide, hydrogen, fluorine, or permanganate.

In the electrolytic refining of copper, impure copper which is formed into slabs directly from the crude metal as it is obtained from copper ore is utilized. These slabs are used as the anode in an electrolytic cell. Often, a sheet of pure copper is used as the cathode, but stainless steel may also be used. The electrolyte is generally a dilute solution of a salt of $Cu^{2+}$. As electricity passes through the cell, copper is oxidized to $Cu^{2+}$ at the impure copper anode, and $Cu^{2+}$ is reduced to metallic copper at the pure copper or stainless steel cathode, which may be coated with a thin layer of graphite so that the fresh copper deposit can be easily removed. As the impure metal slab anode dissolves, any metals that are harder to oxidize than copper will not dissolve, but will drop into a sludge in the bottom of the cell, from which they can be recovered. Metals that are easier to oxidize than copper will dissolve into the electrolyte, but will not plate out at the cathode. Copper produced by this method generally has a purity of about 99.95 percent.

The use of a pure copper sheet as the cathode has a number of disadvantages. Exposure of portions of the copper plate to air in the vicinity of the electrolyte can result in corrosion of the copper sheet. Moreover, the copper sheet must be supported above the electrolyte, and must be connected to a voltage source. Both of these functions are typically carried out by suspending the sheet below a hanger bar. When the hanger bar is made of copper, a high electrical conductivity is obtained, and the copper plate is easily attached to the hanger bar. However, the copper hanger assembly is susceptible to corrosion, and has a relatively low tensile strength. As the process proceeds, the cathode sheet grows heavier, while at the same time the tensile strength of the copper in the hanger bar may decrease due to heating and softening of the copper.

Coating or jacketing the copper hanger bar with a corrosion resistant metal, such as stainless steel, presents a number of other difficulties. Attachment of the copper sheet to the jacketing metal in a way that provides sufficient support for the sheet and sufficient electrical contact between the sheet and the coating or jacketing is often difficult. Moreover, preparing the coated or jacketed hanger assembly is difficult and expensive, and existing methods may allow electrolyte to leak inside the jacket, corroding the inner copper bar, or may result in unacceptably high contact resistance between the inner core and the metal jacket. This is of particular concern where the jacketing metal has an electrical conductivity lower than that of the core metal.

U.S. Pat. No. 4,647,358 to Bartsch et al. discloses a cathode in FIGS. 4, 6, and 7 that comprises a plate 1 welded to a sheath 2 tightly surrounding a hollow copper bar 3. The plate and the sheath may be formed of stainless steel. The oval shape of the copper bar and sheath shown in FIG. 4 results from deforming a copper bar and sheath of circular cross section, as shown in FIG. 3. Reference characters 5, 6, and 7 in FIG. 4 identify welds.

U.S. Pat. No. 4,871,436 to den Hartog discloses a hanger bar for an electrode. As shown in the drawings, an electrode plate 6 is suspended from a hanger bar 1 formed from a copper sheath 8 drawn over steel and copper core elements 9 and 10, respectively. In the finished hanger bar, copper core elements are located at the ends of the hanger bar, and the steel core element is disposed between them.

U.S. Pat. No. 4,882,027, to Borst et al., discloses an electrode, shown in FIGS. 1–3, made up of stainless steel plate 16 with lugs 18, 20 at its top edge welded to copper cladding 14 about steel or iron bar 12.

U.S. Pat. No. 3,260,662, to Henegar, discloses an anode designed for use in an electrolytic alkali-chlorine cell. As shown in FIG. 1, the lead-in 21A of a brass pipe is pressed into the thick-wall portion 12A of a titanium sleeve embedded in graphite anode 14A.

U.S. Pat. No. 2,434,731, to Eltz, U.S. Pat. No. 3,515,661, to Coulter et al., and U.S. Pat. No. 4,606,804, to Schulke et al., disclose further examples of plate-type electrodes designed for use in electrolytic cells.

SUMMARY OF THE INVENTION

The present invention is directed to an electrode assembly comprising (a) a hanger core comprising an electrically conductive metal and having two opposed ends, an outer surface, and a curved cross section; (b) a metal tube coaxial with said hanger core and having two opposed ends, an inner surface, an outer surface, and a cross section comprising a rectangle with outwardly curved sides, wherein at least a portion of said outer surface of said hanger core is in contact with at least a portion of said inner surface of said metal tube, and wherein said ends of said hanger core protrude beyond said ends of said metal tube; and (c) a metal sheet having one edge attached to said outer surface of said metal tube along the length of said metal tube, and perpendicular to the tangent of said outer surface at the point of attachment.

The present invention is also directed to a process for producing an electrode assembly comprising: (a) forming a hanger assembly by inserting a hanger core of an electrically conductive metal having two opposed ends, an outer surface, and a curved cross section, into a metal tube having two opposed ends, an inner surface, an outer surface, and a rectangular cross section, until said opposed ends of said hanger core protrude beyond said opposed ends of said metal tube, wherein the outer surface of said hanger core displaces the sides of said rectangular cross section of said tube outward, effecting good electrical contact between said outer surface of said core and said inner surface of said tube; and (b) attaching one edge of a metal sheet to said outer surface of said metal tube along the length of said metal tube, and perpendicular to the tangent of said outer surface at the point of attachment.

It is an object of the present invention to provide a metal sheet electrode assembly having a jacketed hanger assembly for use in electrolytic refining or in the electrowinning of metals, and having superior tensile strength, as well as superior electrical conductivity, resistance to corrosion, and low contact resistance.

It is a further object of the present invention to provide a simple, inexpensive process for the manufacture of said cathode assembly, using readily obtainable materials, which results in a substantial cost savings over prior art processes.

BRIEF DESCRIPTION OF THE DRAWINGS

The present invention will become more fully understood from the detailed description given herein below and the accompanying drawings which are given by way of illustration only, and thus, are not limitative of the present invention, and wherein.

DETAILED DESCRIPTION OF THE INVENTION

The hanger core of the present invention preferably comprises a core having a round cross section. Also preferred is a hanger core that is solid. Copper is preferred as the electrically conductive hanger core metal.

The metal tube of the present invention preferably has a square cross section. Preferred are metal tubes made of steel, most preferably stainless steel.

The metal sheet of the present invention is preferably a steel sheet. Most preferred are sheets made of stainless steel.

The embodiments described herein are not intended to limit the invention, and changes can be made thereto without departing from the spirit and scope of the invention. For example, a hanger core having an elliptical cross section and a metal tube jacket having a rectangular cross section can be used, such that when the hanger core is pressed into the metal tube, the sides of the metal tube are displaced outward. The present invention can thus be used with a wide variety of solid or hollow core elements and with a variety of metal tube jackets, so long as the curved outer surface of said core element displaces outward the outer surface of said metal tube jacket, effecting good electrical contact between said outer surface of said core element, and the inner surface of said metal tube jacket.

Moreover, the present invention has a wide applicability in electrolytic refining and manufacturing. Examples include the manufacture of chlorates by the electrolysis of brines; the electrolysis of concentrated chlorate solutions to yield perchlorates; the electrolytic deposition of very pure manganese dioxide using, e.g., a titanium anode produced according to the present invention; the electrolysis of water to provide a hydrogen feedstock for ammonia synthesis; the electrolysis of potassium fluoride to provide fluorine; or the oxidation of potassium manganate to form potassium permanganate. In addition to copper, the present invention can be used to electrolytically refine a number of metals, including zinc, chromium, nickel, cadmium, or cobalt.

Figure 1:
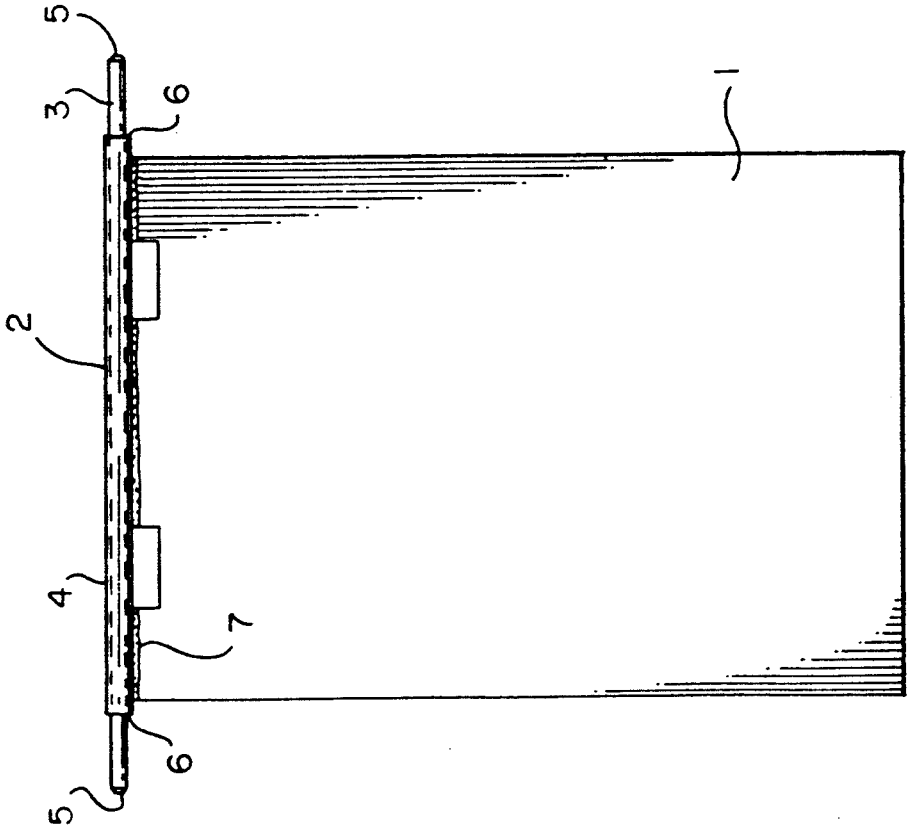
FIG. 1 is an overall view of a cathode assembly of the present invention.

FIG. 1 illustrates an electrode assembly in accordance with the present invention. The electrode assembly of FIG. 1 comprises a metal sheet 1 attached by one edge to a hanger bar assembly 2. Said hanger bar assembly comprises a hanger core 3 inside a metal tube jacket 4, said metal tube jacket 4 having a cross section comprising a rectangle with outwardly curved sides. The outer surface of said hanger core 3 is in good electrical contact with the inner surface of said metal tube jacket 4. The ends 5 of said hanger core 3 protrude beyond the ends 6 of said metal tube jacket 4 and allow connection to a voltage source. In FIG. said metal sheet 1 is rigidly attached to the outer surface of said metal tube jacket 4 by a continuous weld 7 along both sides of one edge of said metal sheet 1.

Figure 3:
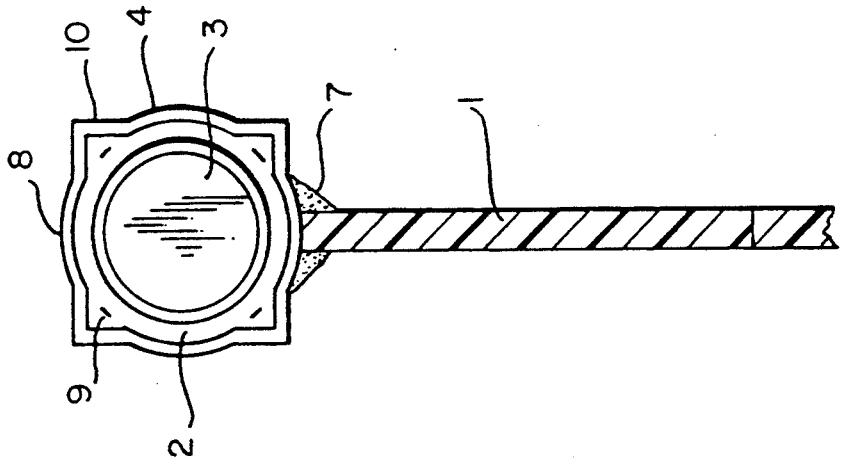
FIG. 3 is a longitudinal cross section through the cathode assembly according to FIG. 1 on an enlarged scale.
Figure 2:
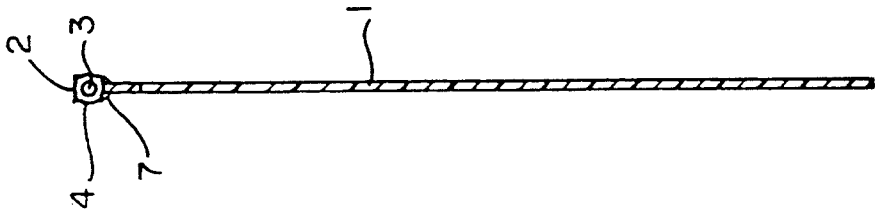
FIG. 2 is a longitudinal cross section through the cathode assembly according to FIG. 1.

FIG. 2 illustrates a longitudinal cross section of the electrode assembly of FIG. 1, and FIG. 3 illustrates an enlarged view of FIG. 2.

FIG. 3 shows said outwardly curved sides 8 of said metal tube jacket 4. In the curved portion of said outwardly curved sides 8, said outer surface 9 of said hanger core 3 makes good electrical contact with said inner surface 10 of said metal tube jacket 4.

The present invention is further illustrated by the following non-limiting Example.

EXAMPLE

A square tube of 316L stainless steel tubing, meeting ASTM (American Society for Testing and Materials) standards as specified by ASTM A240-89b, and measuring $\frac{7}{8}$ inch (+/−0.01) inside dimension and 1 inch (+/−0.01 inch) outside dimension and measuring 3 feet, 1 inch (+/−1/32 inch) in length is placed in a jig.

A solid copper bar of electrical grade quality and meeting ASTM standards as specified by ASTM B2-88, and measuring 1 inch (+/−0.01) in diameter, and 4 feet $4\frac{1}{2}$ inches (+/−1/32 inch) in length, and having a $\frac{1}{8}$ inch bevel on each end, is pressed through said tube by a hydraulic ram using approximately 3000 psi of pressure. The stainless steel tube is centered on the copper bar, which extends $7\frac{3}{4}$ inches (+/−$\frac{1}{8}$) on each end of the tube. The entire hanger bar assembly formation is done at ambient temperature, and takes approximately 10 seconds, measured from when the materials are placed in the jig.

A sheet of 316L stainless steel, meeting ASTM thickness of 10 or 11 gauge, a width of 3 feet, and a length of 4 feet to 4 feet, 6 inches, is welded to the hanger bar assembly using a wire feed welding machine utilizing (metal Inert Gas) technology. The welding wire used is 316L stainless steel wire on a continuous feed spool, measuring 0.035 inches in diameter and meeting the wire quality standard designated by ASME (American Society of Mechanical Engineers) SFA 5.9. The welding gas used is a mixture of 90% helium, 7.5% argon, and 2.5% carbon dioxide. The welding current is operated at approximately 90 amps at 18 volts DC. A continuous weld is used on both sides of the sheet for its entire width.

The welds are visually inspected for continuity during manufacture, and the voltage drop between the copper bar and the stainless steel sheet is measured after the cathode assembly is placed in service. A less than 1 millivolt drop between the copper bar and the stainless steel sheet is required.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A process for preparing a cathode assembly consisting of:

(a) forming a hanger assembly by (1) placing a square tube of 316L stainless steel tubing, meeting ASTM standards specified by ASTM A240-89L, and having an inside dimension of $\frac{7}{8}\pm0.1$ inch and an outside dimension of $1\pm0.01$ inch and a length of 3 feet, 1 inch $\pm1/32$ inch, in a jig; (2) pressing a solid copper bar of electrical grade quality, meeting ASTM standards as specified by ASTM B2-88, and measuring 1 +/−0.01 inch in diameter, and 4 feet 4κ inches +/−1/32 inch in length, and having a $\frac{1}{8}$ inch bevel on each end, through said tube with a hydraulic ram using approximately 3000 psi of pressure, until said stainless steel tube is centered on said copper bar, which extends $7\frac{3}{4}$ inches (+/−$\frac{1}{8}$) on each end of the tube; and (b) welding a sheet of 316L stainless steel, meeting ASTM standards as specified by ASTM A240-89b, having a thickness of 10 or 11 gauge, a width of 3 feet, and a length of 4 feet to 4 feet, 6 inches, to the hanger bar assembly with a wire feed welding machine using a welding wire of 316L stainless steel wire on a continuous feed spool, measuring 0.035 inches in diameter, and meeting the wire quality standard designated by ASME SFA 5.9, and using a welding gas which is a mixture of 90% helium, 7.5% argon, and 2.5% carbon dioxide.

* * * * *